(12) United States Patent
Ogram

(10) Patent No.: US 11,142,087 B1
(45) Date of Patent: Oct. 12, 2021

(54) ELECTRIC VEHICLE RECHARGING

(71) Applicant: Mark Ellery Ogram, Tucson, AZ (US)

(72) Inventor: Mark Ellery Ogram, Tucson, AZ (US)

( * ) Notice: Subject to any disclaimer, the term of this patent is extended or adjusted under 35 U.S.C. 154(b) by 0 days.

(21) Appl. No.: 17/300,279

(22) Filed: May 10, 2021

(51) Int. Cl.
| | |
|---|---|
| *H02J 7/00* | (2006.01) |
| *H02J 7/14* | (2006.01) |
| *B60L 53/80* | (2019.01) |
| *B60L 50/60* | (2019.01) |
| *B60L 58/12* | (2019.01) |
| *B60L 53/16* | (2019.01) |

(52) U.S. Cl.
CPC .............. *B60L 53/80* (2019.02); *B60L 50/66* (2019.02); *B60L 53/16* (2019.02); *B60L 58/12* (2019.02)

(58) Field of Classification Search
USPC ................................................. 320/134, 109
See application file for complete search history.

(56) References Cited

U.S. PATENT DOCUMENTS

| | | | |
|---|---|---|---|
| 6,094,028 A * | 7/2000 | Gu ............................ | B60S 5/06 320/109 |
| 8,436,721 B1 | 5/2013 | Lee et al. | |
| 9,031,732 B1 | 5/2015 | Baskin et al. | |
| 9,371,669 B2 | 6/2016 | Berg et al. | |
| 10,478,845 B1 | 11/2019 | Shafer | |
| 10,494,241 B2 | 12/2019 | Petronek | |
| 10,691,077 B2 | 6/2020 | Lagorgette | |
| 10,734,148 B2 | 8/2020 | Jotter et al. | |
| 10,781,954 B2 | 9/2020 | Remenik | |
| 10,793,084 B2 | 10/2020 | Jiang et al. | |
| 10,807,492 B1 * | 10/2020 | Holland ................... | B60L 53/14 |
| 10,895,094 B2 | 1/2021 | Li et al. | |
| 10,910,608 B2 | 2/2021 | Monismith | |
| 10,926,826 B2 | 2/2021 | Jiang et al. | |
| 10,938,003 B2 | 3/2021 | Capati et al. | |
| 10,946,763 B2 | 3/2021 | McGrath et al. | |
| 10,971,863 B1 | 4/2021 | Wu et al. | |
| 10,978,826 B2 | 4/2021 | Li et al. | |
| 10,978,831 B2 | 4/2021 | Zhao et al. | |
| 10,978,887 B2 | 4/2021 | Nguyen et al. | |
| 10,985,504 B2 | 4/2021 | Masunaga | |
| 2009/0262266 A1 * | 10/2009 | Harbin ................... | H02J 7/0045 349/1 |
| 2016/0368464 A1 * | 12/2016 | Hassounah ............. | B60L 53/80 |
| 2017/0327091 A1 * | 11/2017 | Capizzo .................... | B60S 5/02 |
| 2018/0149681 A1 * | 5/2018 | Chakrabarty ........... | B60L 58/20 |
| 2019/0237715 A1 * | 8/2019 | Seman, Jr. ................ | B60L 3/06 |
| 2021/0057694 A1 * | 2/2021 | Zeiler ................... | H01M 50/20 |
| 2021/0143507 A1 * | 5/2021 | Zhang ................... | G01R 31/371 |

* cited by examiner

*Primary Examiner* — Alexis B Pacheco

(57) ABSTRACT

A system to recharge an electric vehicle in which the rechargeable battery within the electric vehicle. The rechargeable battery is disengaged from electric vehicle, removed, and a replacement rechargeable battery is placed within the electric vehicle. In this manner, the electric vehicle is fully charged without having to wait at a charging station. An added feature is the easy disconnect of the rechargeable battery from the electric vehicle using an electromagnet connector for the electrical connection. The electromagnet is selectively powered by a secondary battery and adapted to disconnect the releasable electrical connector from the rechargeable battery when said electromagnet is not activated.

17 Claims, 3 Drawing Sheets

ELECTRIC VEHICLE RECHARGING

BACKGROUND OF THE INVENTION

This invention relates generally to electrical vehicles and more particularly to a ready and fast mechanism to provide a "recharge" to the vehicle.

Unlike gasoline and diesel vehicles which can use a service station, electric vehicles need to be recharged either from special connectors installed at the residence, or at special charging stations found at designated locations. Finding these locations can be difficult and time consuming and with the limited range that an electric vehicle is handicapped with, long distance travel becomes complex if not impossible.

The infrastructure of charging stations isn't present.

Further, the charging of the rechargeable battery within the electric vehicle takes much more time than the application of gasoline or diesel to an international combustion engine's fuel tank.

Another problem with the electric vehicle is that when emergency services are called to assist at an accident involving the electric vehicle, there is additional effort required to isolate the rechargeable battery to keep the responders safe from the high voltage.

It is clear there is a need to improve electric vehicles in order to make them acceptable to the general public.

SUMMARY OF THE INVENTION

The present invention is a system to recharge an electric vehicle. The electric vehicle is "recharged" by replacing the depleted rechargeable battery with a fully recharged replacement. This requires that the spent rechargeable battery within the electric vehicle be disengaged from electric vehicle, removed, and a replacement rechargeable battery is placed within the electric vehicle. In this manner, the electric vehicle is fully charged without having to wait at an electrical outlet.

An added feature of the present invention is the easy disconnect of the rechargeable battery from the electric vehicle using an electromagnet connector for the electrical connection which can be activated from the replacement/charging station, internal to the vehicle, or remotely using a radio frequency transmitter. Ideally, the electromagnet is selectively powered by a secondary battery which is adapted to disconnect the releasable electrical connector from the rechargeable battery when said electromagnet is not electrically activated.

More specifically, the recharging system of this invention involves a rechargeable battery contained within the electric vehicle. This rechargeable battery is ideally secured to the electric vehicle via releasable clamps and electrically connected to the electric vehicle via a releasable electrical connector.

To replace the rechargeable battery ideally utilizes different mechanisms at the replacement station although in some embodiments, these mechanisms are combined. The first mechanism is adapted to release the clamps from the rechargeable battery to physically free the rechargeable battery, and then release the electrical connector from the electric vehicle. This frees the rechargeable battery from the vehicle.

A second mechanism adapted to remove the rechargeable battery from the electric vehicle. Due to the weight of rechargeable batteries, this is ideally performed using a robotic mechanism that slides or lifts the battery from the vehicle and places it onto a rack for subsequent recharging.

A third mechanism places a fully charged replacement rechargeable battery into the electric vehicle. This mechanism is similar to the second mechanism used to remove the spent rechargeable battery only in the opposite direction.

Finally, a mechanism engages the releasable clamps to the replacement rechargeable battery and the releasable electrical connector is secured to the replacement rechargeable battery. This completes the process and allows the now fully recharged electric vehicle to continue with its journey.

Electric vehicles use a rechargeable battery, such as but limited to, those described in U.S. Pat. No. 10,910,608, entitled "Electric Vehicle Battery Cell" issued to Monismith et al. on Feb. 2, 2021, incorporated hereinto by reference.

To facilitate this process, the electrical connection between the rechargeable battery should be as easily disconnected as is feasible. The electrical connection between the electric vehicle and the rechargeable battery is removed to allow the battery to be withdrawn from the electric vehicle. Those of ordinary skill in the art readily recognize a variety of such connectors including, but not limited to those described in: U.S. Pat. No. 10,971,863, entitled "High Speed Connector Assembly and Electrical Connector Thereof" issued to Wu et al. on Apr. 6, 2021; U.S. Pat. No. 10,985,504, entitled "Electrical Connector and Connector Device" issued to Masunaga on Apr. 20, 2021; and, U.S. Pat. No. 10,978,831, entitled "Electrical Connector Having a First Power Contact and a Shorter Second Power Contact" issued to Zhao et al. on Apr. 13, 2021, all of which are incorporated hereinto by reference.

In the preferred embodiment, the electrical connection is engaged using an electromagnet and the contacts are secured via magnets. The electromagnet is spring loaded so that when no power is applied to the electromagnet, the magnetic electrical contacts are broken and only reengaged when power is applied to the electromagnet, pushing the assembly against the rechargeable battery. In this way, the rechargeable battery is only secured when needed and is disconnected when not.

Further, to assist in the removal and replacement of the rechargeable battery, clamps must be used to secure the rechargeable battery to the vehicle so that the rechargeable battery does not move during motion of the electric vehicle. These clamps, although in one embodiment are manually applied, are preferably applied using remotely activated using solenoids, hydraulics, and the such; thereby allowing the easy release, or securing, of the rechargeable battery.

Clamping systems are well known and are often remotely activated to engage or disengage from their target. Such clamping mechanisms are described in: U.S. Pat. No. 10,494,241, entitled "Hydraulic Clamping Systems having Load Side-Shifting Variably Responsive to Load Weight" issued to Petronek on Dec. 3, 2019; U.S. Pat. No. 10,691,077, entitled "Watch Comprising a Magnetic Clamping Device" issued to Laorgette on Jun. 23, 2020; and U.S. Pat. No. 10,793,084, entitled "Electric Vehicle Holder" issued to Jiang et al. on Oct. 6, 2020, all of which are incorporated hereinto by reference.

In some embodiments, the electric vehicle uses at least two rechargeable batteries to power the vehicle. This configuration reduces the individual battery's weight allowing it to be removed or placed within the vehicle with more ease. Once all of the batteries have been installed, they are then connected in series to obtain the voltage and wattage desired for the vehicle's operation.

A meter within the driving compartment is used to indicate the charge level of the rechargeable battery within the vehicle so that the operator may plan on when to replace the rechargeable battery with a fully charged rechargeable battery. Ideally, the meter mechanism issues a warning (buzzer or flashing light) if the charge level is below a specified level.

Access to the rechargeable battery is typically done through a hatch or cover which provides protection for the rechargeable battery as well as protection for humans from touching the batteries and being shocked therefrom.

In the preferred embodiment of the invention, a dedicated system is used to engage/disengage the electrical contacts between the rechargeable battery and the drive mechanism of the electric vehicle. In the preferred embodiment, a secondary battery is employed to control an electromagnet. When charged, the electromagnet pushes the electrical contacts against the rechargeable battery so that the electric vehicle is powered. When the electromagnet is passive, springs pull the contacts away from the rechargeable battery to disconnect and renders the rechargeable battery isolated from the system.

Magnetic connections are used in a variety of situations including electrical connections and are described in: U.S. Pat. No. 10,781,954, entitled "Fastening System" issued to Remenik on Sep. 22, 2020, incorporated hereinto by reference.

Electromagnets and their uses are well known in the art. This includes, but is not limited to, electromagnets described in: U.S. Pat. No. 10,734,148, entitled "Electromagnetic Holding Magnet and Method for Manufacturing, Electromagnetic Locking Element and Use of the Same" issued to Jotter et al. on Aug. 4, 2020; U.S. Pat. No. 10,895,094, entitled "Automated Door Lock" issued to Li et al. on Jan. 19, 2021; and, U.S. Pat. No. 10,978,826, entitled "Electrical Connector Assembly having a magnet and Heat Insulation or Waterproof Feature and Assembling Method of the Same" issued to Li et al. on Apr. 13, 2021, all of which are incorporated hereinto by reference.

When the electromagnet is engaged and the rechargeable battery is connected to the vehicle, in the ideal embodiment, power from the electromagnet is used to charge the secondary battery. Note, power from the secondary battery is only used when the electromagnet has engaged the rechargeable battery, hence, the secondary battery is kept charged.

To facilitate safety for emergency crews, the electromagnet is also capable of being deactivated using a radio transmitter. Once the electromagnet is so deactivated, the rechargeable battery is electrically isolated reducing the danger from a shock.

Those of ordinary skill in the art readily recognize a variety of mechanisms which may be used for remote activation/deactivation of the electromagnet, including, but not limited to those described in: U.S. Pat. No. 8,436,721, entitled "Automobile Theft Protection and Disablement System" issued to Lee et al., on Mar. 7, 2013; U.S. Pat. No. 9,031,712, entitled "Remote Management and Control of Vehicular Functions via Multiple Networks" issued to Baskin et al. on May 12, 2015; and, U.S. Pat. No. 9,371,669, entitled "Remote-Activation Lock System and Method" issued to Berg et al. on Jun. 21, 2016, all of which are incorporated hereinto by reference.

The now removed and at least partially depleted rechargeable battery may now be recharged using any of the well known techniques, including, but not limited to those described in U.S. Pat. No. 10,946,763, entitled "Charging of an Electric Vehicle Fleet" issued to McGrath et al. on Mar. 16, 2021; and U.S. Pat. No. 10,978,887, entitled "Fast Charging Battery Pack and Methods to Charge Fast" issued to Nguyen et al. on Apr. 13, 2021, both of which are incorporated hereinto by reference.

The invention, together with various embodiments thereof, will be more fully explained by accompanying drawings and the following descriptions thereof.

DRAWINGS IN BRIEF

DRAWINGS IN DETAIL

Figure 1A:
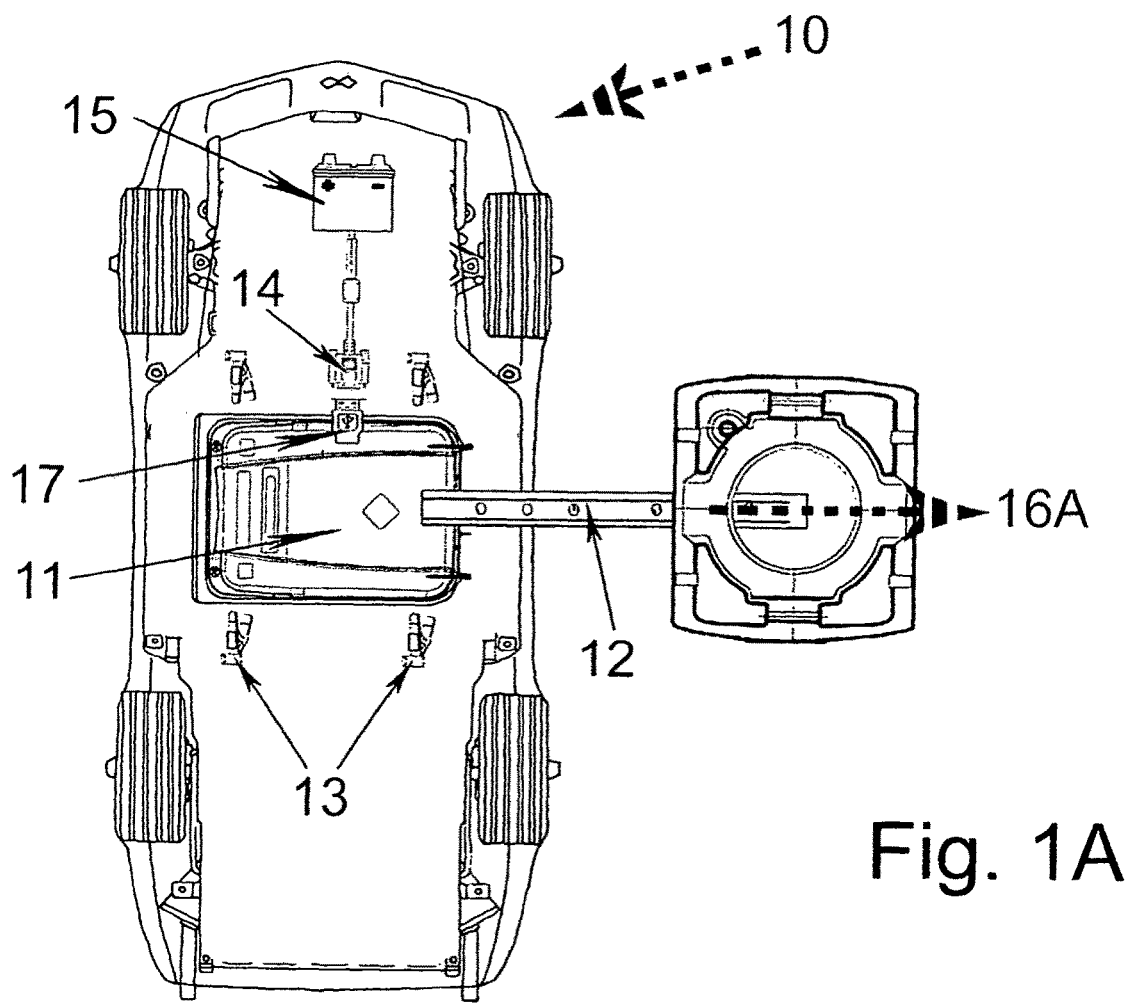
FIGS. 1A and 1B illustrate in block form the removal of a depleted battery.
Figure 1B:
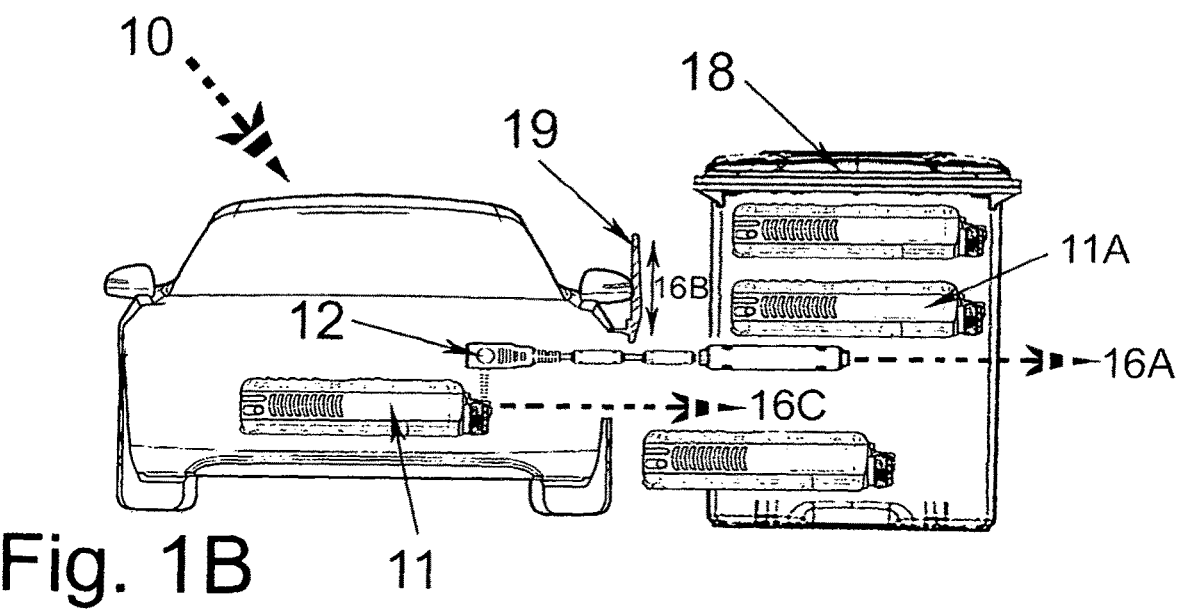

FIGS. 1A and 1B illustrate in block form the removal of a spent battery.

Vehicle 10 has a depleted rechargeable battery 11 contained therein. To remove rechargeable battery 11, clamps 13 are disengaged and electrical connector 14 is disengaged from electrical contact 17. Disengagement of electrical connector 14 is made via an electromagnet which is powered by a secondary battery 15.

Once rechargeable battery 11 is "freed", armature 12 engages the rechargeable battery via door 16B (which is opened to grant access to the rechargeable batter 11). Armature 12, withdraws (arrow 16A) rechargeable battery 11 onto holder 18 as indicated by arrow 16C into rack 18.

Replacement of a fully charged rechargeable battery from rack 18 is performed in the opposite. Armature 12 engages a rechargeable battery within rack 18, and pushes (opposite arrow 16A) the battery into vehicle 10. Armature 12 retracts, panel 19 closes; clamp 13 reengages and electrical connector 14 makes contact with electrical contact 17. Car 10 is now fully charged and ready for service.

Figure 2:
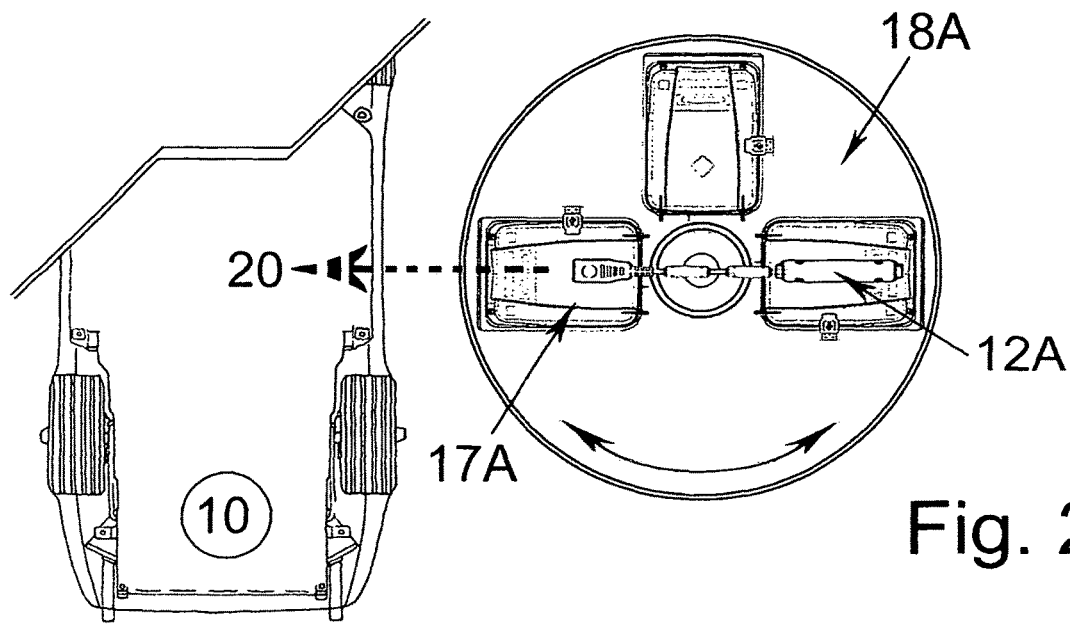
FIG. 2 illustrates an alternative to the rack 18 of FIGS. 1A and 1B.

FIG. 2 illustrates an alternative embodiment for the rack 18 of FIGS. 1A and 1B.

This embodiment uses carrousel 18A, which rotates to present blank receptacles to receive the spent rechargeable battery from the car 10, and to present charged rechargeable batteries 17A for insertion using armature 12A, as indicated by arrow 20.

Figure 3:
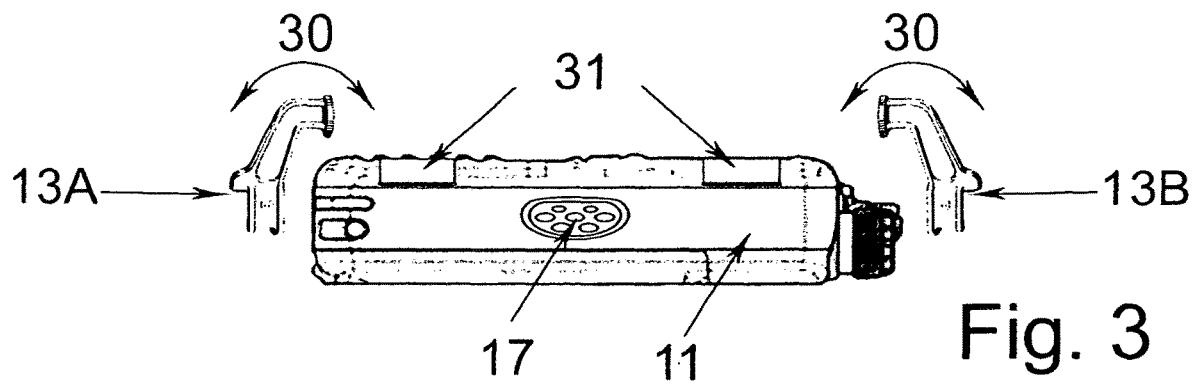
FIG. 3 illustrates the preferred engagement of the clamps to the rechargeable battery.

FIG. 3 illustrates the engagement of the clamps to the rechargeable battery.

Rechargeable battery 11 has an electrical connector 17 as well as recesses 31 formed therein. Clamps 13A and 13B, operated using solenoids or hydraulics, moved as indicated by arrows 30 to engage with recesses 31. Once the clamps 13A and 13B are engaged, rechargeable battery is properly positioned and secured to the vehicle.

Figure 4:
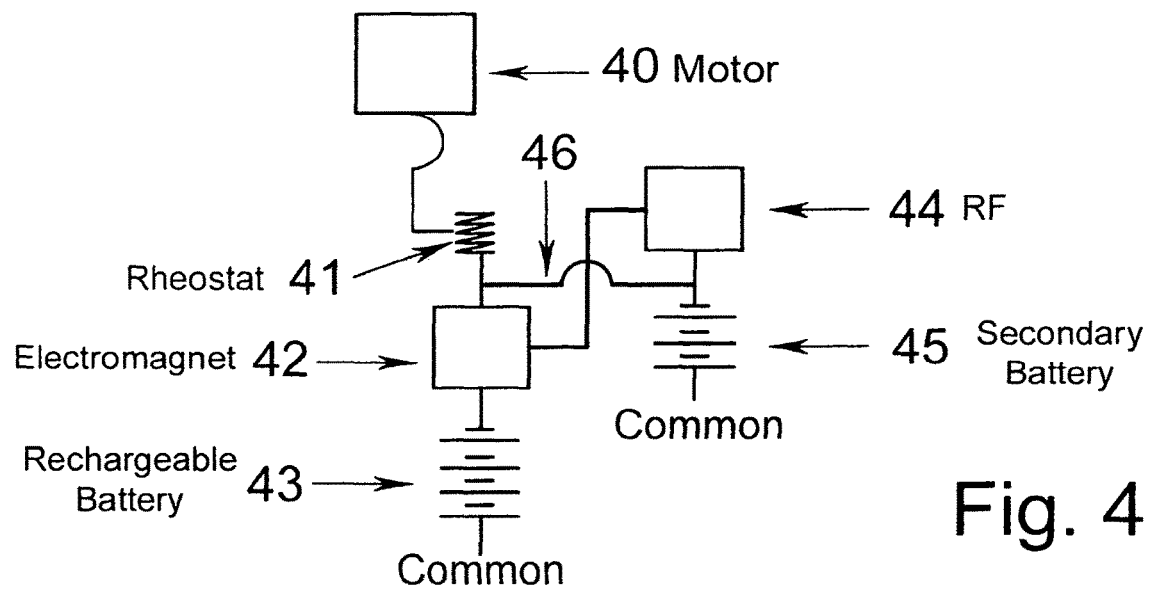
FIG. 4 is an electrical schematic of the preferred embodiment.

FIG. 4 is an electrical schematic of the preferred embodiment.

Rechargeable battery 43 communicates electrical charge to the electrical motor 40 via rheostat 41 (the throttle). Electromagnet 42 selectively engages the rechargeable battery 43 with rheostat 42 via relay switch 44. In a passive state, no electricity from secondary battery 45 (via relay switch 44) is communicated to the electromagnet 42 and electromagnet 42 disengages from rechargeable battery 43. In an active state, when power is provided to electromagnet 42, rechargeable battery 43 is connected allowing electrical energy to flow to rheostat 41; additionally, electrical energy via connection 46 also flows to secondary battery 45 to maintain a full charge therein.

Figure 5:
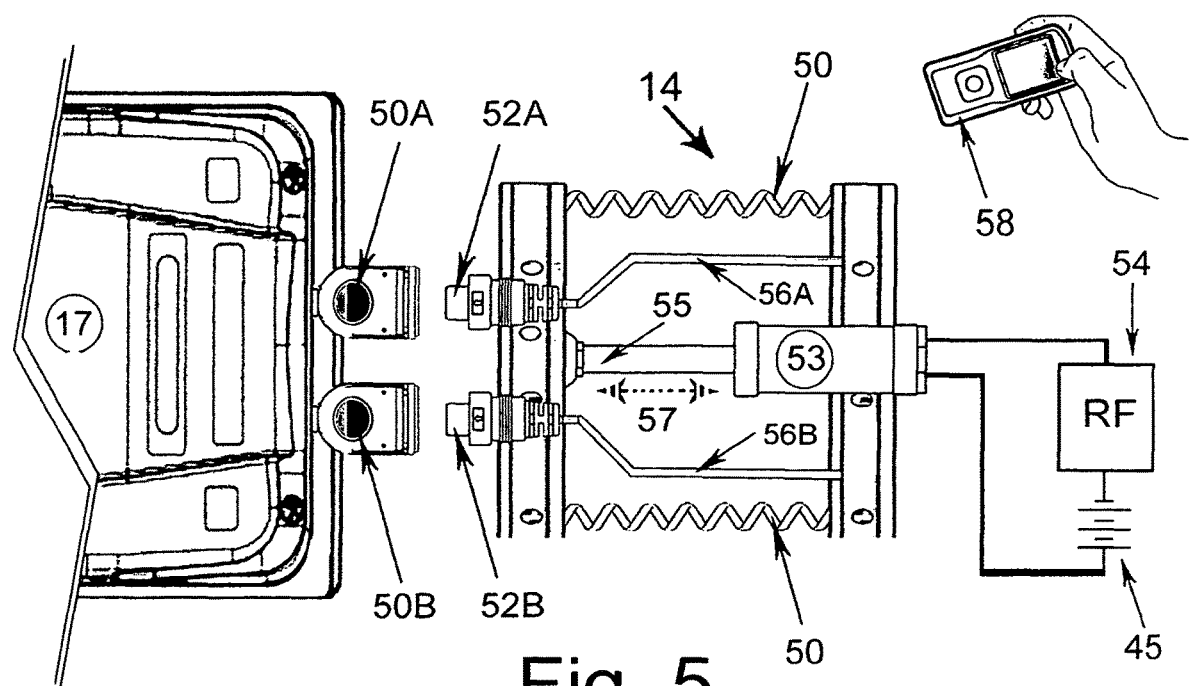
FIG. 5 illustrates the preferred engagement and disengagement of the electrical connector with the rechargeable battery.

FIG. 5 illustrates the engagement and disengagement of the electrical connector with the rechargeable battery.

Rechargeable battery 17 has connectors 50A and 50B. Electromagnet connector 14 is adapted to engage contacts 52A and 52B with connectors 50A and 50B so as to provide electrical power via wires 56A and 56B to the vehicle. This engagement is made when electromagnet 53 forces ram 55 as indicated by arrows 57 so that contacts 52A and 52B engage with connectors 50A and 50B.

In the active state, electromagnet 53 has sufficient power to overcome the forces exerted by springs 50; in an inactive state, when electrical power from secondary batter 45 is not provided to electromagnet 53, springs 50 breaks the connection between contacts 52A and 52B with connectors 50A and 50B.

The electrical power provided to electromagnet 53 may also be severed, in the preferred embodiment, via Radio Frequency (RF) receiver 54 in response to manual operation of remote 58. This attribute of the preferred embodiment permits emergency personnel to disengage the rechargeable battery to eliminate the risk of high voltage shocks.

Figure 6A:
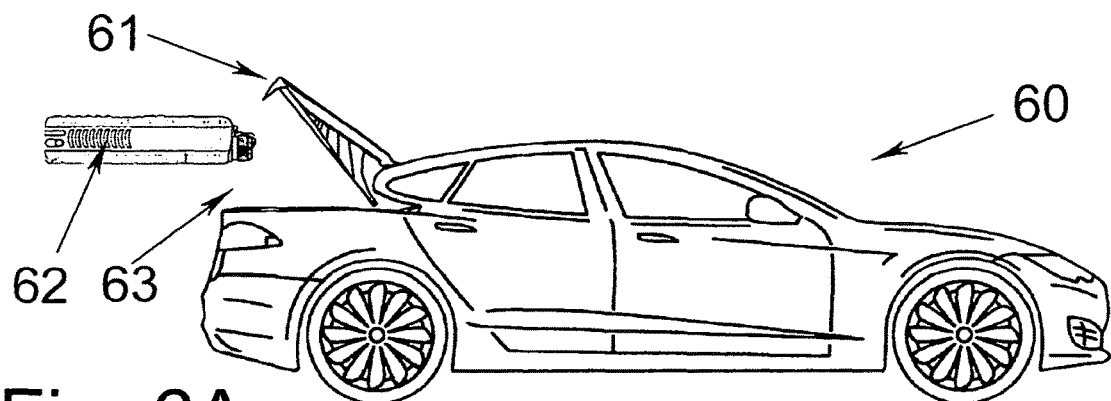
FIGS. 6A and 6B illustrate the embodiment of the invention with multiple rechargeable batteries.
Figure 6B:
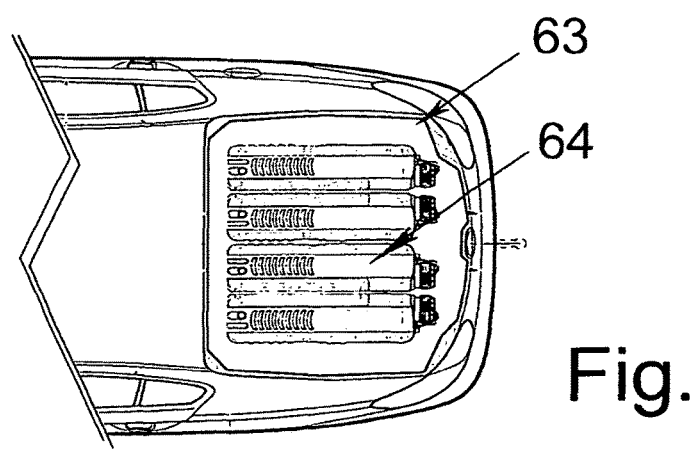

FIGS. 6A and 6B illustrate the embodiment of the invention with multiple rechargeable batteries.

In this embodiment, rechargeable batteries 64 are contained within the "trunk" or rear of the vehicle and may individually, such as illustrated by rechargeable battery 62, from the trunk 63 when lid 61 is opened.

As before, rechargeable batteries 64 employ the clamping and electrical disconnect already discussed above.

In this manner, a single battery, weighing much less, is readily removed when it becomes depleted.

It is clear that the present invention provides for an improve electric vehicles in order to make these vehicles more acceptable to the general public.

What is claimed is:

1. A system to recharge an electric vehicle comprising:
   a) a rechargeable battery contained within the electric vehicle, said rechargeable battery being secured to the electric vehicle via releasable clamps and electrically connected to the electric vehicle via a releasable electrical connector; and,
   b) a rechargeable battery replacement system having,
      1) a first mechanism adapted to release the clamps from the rechargeable battery and to release the electrical connector from the electric vehicle,
      2) a second mechanism adapted to separate the rechargeable battery from the electric vehicle,
      3) a third mechanism adapted to place a replacement rechargeable battery into the electric vehicle, and,
      4) a fourth mechanism adapted to engage the releasable clamps to the replacement rechargeable battery and to connect the releasable electrical connector to the replacement rechargeable battery;
      5) a secondary battery contained within the electric vehicle;
      6) an electromagnet selectively communicating with the secondary battery and adapted to disconnect the releasable electrical connector from the rechargeable battery when said electromagnet is not activated; and
      7) wherein the rechargeable battery provides a charge to the secondary battery when the electromagnet is engaged.

2. The system to recharge an electric vehicle according to claim 1, wherein the electric vehicle contains at least two rechargeable batteries.

3. The system to recharge an electric vehicle according to claim 1, further including a meter mechanism communicating, via said releasable electric connector, a charge level for the replacement rechargeable battery.

4. The system to recharge an electric vehicle according to claim 3, wherein the meter mechanism issues a warning if the charge level is below a specified level.

5. The system to recharge an electric vehicle according to claim 1, wherein the rechargeable battery replacement system includes an electrical recharging mechanism securable to a removed rechargeable battery.

6. The system to recharge an electric vehicle according to claim 1, wherein the electric vehicle includes a selectively openable panel adapted to reveal the rechargeable battery to the rechargeable battery replacement system.

7. The system to recharge an electric vehicle according to claim 1, wherein said electromagnet is responsive to a remote transmitter.

8. An electric vehicle comprising:
   a) a rechargeable battery being a power source for the electric vehicle and contained within the electric vehicle, said rechargeable battery being electrically connected to the electric vehicle via a releasable electrical connector;
   b) a secondary battery contained within the electric vehicle; and,
   c) an electromagnet selectively powered by the secondary battery and configured to disconnect the releasable electrical connector from the rechargeable battery when said electromagnet is not electrically activated;
   d) an electromagnet selectively communicating with the secondary battery and adapted to disconnect the releasable electrical connector from the rechargeable battery when said electromagnet is not activated; and
   e) wherein the rechargeable battery provides a charge to the secondary battery when the electromagnet is engaged.

9. The electric vehicle according to claim 8, wherein said electromagnet is responsive to a remote transmitter.

10. The electric vehicle according to claim 8, further including:
    a) a removal mechanism configured to separate the rechargeable battery from the electric vehicle; and,
    b) a second mechanism adapted to place a replacement rechargeable battery into the electric vehicle.

11. The electric vehicle according to claim 10, wherein the electric vehicle contains at least two rechargeable batteries.

12. The electric vehicle according to claim 10, wherein the electric vehicle includes a selectively opened panel adapted to reveal the rechargeable battery.

13. An electric vehicle comprising:
    a) a rechargeable battery providing power to the electric vehicle, said rechargeable battery being electrically connected to the electric vehicle via an electromagnet connector; and,
    b) a secondary battery contained within the electric vehicle to selectively activate the electromagnet connector for selective engagement of the rechargeable battery with the electric vehicle.

14. The electric vehicle according to claim 13 further including a clamping system selectively securing the rechargeable battery to the electric vehicle.

15. The electric vehicle according to claim 13,
   a) wherein the rechargeable battery is removable from the electric vehicle; and,
   b) wherein a replacement rechargeable battery is placable within the electric vehicle.

16. The electric vehicle according to claim 13, wherein the rechargeable battery provides a charge to the secondary battery when the electromagnet is activated.

17. The electric vehicle according to claim 13, wherein said electromagnet is responsive to a remote transmitter.

\* \* \* \* \*